United States Patent [19]

Terrel

[11] 4,256,499

[45] Mar. 17, 1981

[54] SULFUR CONCRETE COMPOSITION AND METHOD OF MAKING SHAPED SULFUR CONCRETE ARTICLES

[75] Inventor: Ronald L. Terrel, Seattle, Wash.

[73] Assignee: Sulphur Development Institute of Canada, Alberta, Canada

[21] Appl. No.: 73,503

[22] Filed: Sep. 7, 1979

[51] Int. Cl.$^3$ ............................................. C04B 33/04
[52] U.S. Cl. ................................. 106/70; 260/42.24; 106/71
[58] Field of Search ........................................ 106/70

[56] References Cited

U.S. PATENT DOCUMENTS

| | | | |
|---|---|---|---|
| 3,954,480 | 5/1976 | Inderwick | 106/70 |
| 4,025,352 | 5/1977 | Leutner et al. | 106/70 |
| 4,058,500 | 11/1977 | Vroom | 260/42.24 |
| 4,188,230 | 2/1980 | Gillott et al. | 106/70 |

FOREIGN PATENT DOCUMENTS

| | | | |
|---|---|---|---|
| 1039003 | 9/1978 | Canada | 106/70 |
| 53-44938 | 12/1978 | Japan | 106/40 R |
| 1884 | of 1877 | United Kingdom . | |
| 11064 | of 1889 | United Kingdom | 106/70 |

OTHER PUBLICATIONS

Raymont, M. E. D.–Sulphur Concretes and Coatings–Number 4, Technology Series, pub. by Sulphur Development Inst. of Canada (1978).
Malhotra, V. M.–Sulphur Concrete and Sulphur Infiltrated Concrete: Properties, Applications and Limitations–Canmet Report 79-28, May, 1979, pp. 2-3, 13-14.

*Primary Examiner*—Helen M. McCarthy
*Attorney, Agent, or Firm*—Browdy and Neimark

[57] ABSTRACT

Shaped sulphur concrete articles are produced from a moldable composition of a mineral aggregate, mineral binding agent, a sulphur component, such as elemental sulphur, and a liquid vehicle such as water; the mixture is compacted and formed into a shaped body at an elevated compacting pressure, dried to volatilize the liquid vehicle and heated to melt the sulphur, whereafter it is cooled to solidify the sulphur whereby the mineral materials are bonded into a matrix with the sulphur. The articles can be produced without shrinkage with predetermined dimensions and exhibit good compression strength and durability.

15 Claims, 3 Drawing Figures

SULFUR CONCRETE COMPOSITION AND METHOD OF MAKING SHAPED SULFUR CONCRETE ARTICLES

BACKGROUND OF THE INVENTION (I) Field of the Invention

This invention relates to sulphur concrete compositions, to a method of forming articles therefrom, and to the articles so formed.

(II) Description of the Prior Art

Articles such as preformed concrete building blocks, roof and floor tiles, paving slabs, structural members and other articles have previously been formed from concrete comprised of a mixture of cement, such as hydraulic or Portland cement, mineral aggregate and water, plus various optional additives such as air entraining agents, water reducers, plasticizers, waterproofing and possibly others. These materials may in some instances be combined with reinforcement such as steel bars, wires or fibers. The materials are generally blended in a concrete mixer and the resultant wet mixture is placed and densified in a mold or form to produce a desired shape. Hydration of the cement paste then takes place over a period of time after which the mold or form is removed to form the article. Concrete formed in this manner has reasonable strength and durability in most environments except for severe freeze-thaw conditions and in the presence of certain chemicals such as road salts, industrial wastes, etc. In addition, the rising cost of Portland cement, its availability and the high use of energy to manufacture it have made its utilization less attractive for many applications.

Sulphur is readily available in many countries as a by-product of the oil and gas industry. The relatively low cost and unique properties of sulphur have led to its utilization as a construction material particularly to replace or extend the use of Portland cement or asphalt cement.

In British Pat. No. 1,884 there is described an artificial stone formed from a mixture of a cement such as Portland cement, mineral aggregate, clay, water and sulphur and U.S. Pat. No. 3,954,480, A. F. Inderwick, issued May 4, 1976, describes concretes formed from similar ingredients.

Sulphur concretes have also been developed in which elemental or modified sulphur completely replaces the Portland cement. Although this sulphur concrete has the advantage of rapid curing to a usable form by cooling, there are disadvantages in that all the ingredients of the mixture must be heated to about 150° C. prior to and during mixing. Attendant with the requirement for special equipment and handling, many special molds are required since the molten mixture is very fluid. Further, there is the potential danger of workers being exposed to toxic gases during the mixing if the temperature of the sulphur is inadvertently raised too high.

A particular shortcoming of this approach is the high volume of shrinkage that occurs when the formed article cools to ambient temperature, often resulting in distortion as well as inaccurate final dimensions which is unacceptable in blocks used in a mortarless building system, which must be producible with accurate predetermined dimensions. In addition there is a tendency for the mineral aggregate to settle while the sulphur is molten and for segregation of the mineral aggregate and molten sulphur to occur during pouring of the hot mix. Finally the prior method necessitated cleaning of the mold in between the manufacture of each article, since part of the composition would stick to the mold surface after removal of the molded part.

SUMMARY OF THE INVENTION

It has now been found that a new sulphur concrete can be produced without mixing the ingredients at elevated temperatures and without the use of a hydratable cement such as Portland cement. The new sulphur concrete can be premolded into structural units or other articles. In particular building blocks formed from the concrete meet or exceed the requirements for such blocks set forth by ASTM C145, Standard Specification for Solid Load-Bearing Concrete Masonry Units, which are normally fabricated using Portland cement.

The new sulphur concrete is characterized by good strength and durability and can be formed, without shrinkage, as a formed shaped of predetermined dimensions with a good surface finish. In particular articles formed from the sulphur concrete exhibit compressive strength and weathering durability suitable for use in rigorous climates and salt- or acid containing environments. The ability of the sulphur concrete compositions to form molded dimensionally stable articles without shrinkage renders the composition especially useful in mortarless building systems.

Further, the new sulphur concretes do not exhibit the normal brittleness of conventional sulphur concretes and can be produced with improved ductility and durability.

According to the invention there is provided a method of producing a shaped sulphur concrete article comprising:
(a) providing a moldable mixture of a particulate mineral aggregate, a particulate mineral binding agent, a liquid vehicle and a particulate sulphur component,
(b) compacting and forming the mixture into a shaped body of structural integrity,
(c) drying the shaped body to remove said liquid vehicle,
(d) heating the dried body to a temperature effective to melt the sulphur in the dried body, and
(e) cooling the body to solidify the sulphur.

In another aspect of the invention there is provided a sulphur concrete composition comprising a moldable mixture of a particulate mineral aggregate, a particulate mineral binding agent, a liquid vehicle and a particulate sulphur component.

In yet another aspect of the invention there is provided a shaped sulphur concrete article comprising a mixture of particulate mineral aggregate and particulate mineral binding agent bonded together with a sulphur component.

DESCRIPTION OF THE PREFERRED EMBODIMENTS (a) Sulphur Concrete Composition

The sulphur concrete compositions of the invention comprise a moldable mixture of a mineral aggregate, mineral binding agent, a sulphur component, a liquid vehicle, and optionally conventional additives having regard to particular applications.

The compositions are free of hydraulic and asphaltic cements, such as the widely used Portland cement.

The term "moldable" in this specification denotes compositions which can be formed into a shaped body, for example, by precasting in a mold or extruding, pouring or troweling, at substantially ambient temperatures, as is the case with Portland cement concretes.

(i) Mineral Aggregate

The mineral aggregates in the compositions of the invention may include coarse aggregate, fine aggregate and fines.

Coarse aggregate includes gravel, crushed stone, slag and other material of mineral composition having a particle size of at least 4.75 mm and particularly 1.5 cm to 4 cm.

Fine aggregate includes sand and other material of mineral composition having a particle size of about 150 $\mu$m to about 4.75 mm.

Fines include fly ash, pyrrhotite, crushed shale, illite and other material of mineral composition having a particle size less than about 150 $\mu$m.

The mineral aggregage may also comprise natural soil.

It is especially preferred in meeting building standards and specifications to employ sand as the mineral aggregate and in particular a sand complying with all requirements of ASTM C144, Standard Specification for Aggregate for Masonry Mortar.

It is found that sulphur concretes of the invention of the greatest compressive strength can be formed from mineral aggregates with a small coefficient of uniformity. In other words high compressive strength can be achieved by using a gradation of mineral aggregate close to uniform size. Consequently it is reasonable to employ as the mineral aggregate a sand having a substantially uniform particle size.

In particular there may advantageously be employed sand having a particle size in the range of 0.5 to 2 mm or about 10 to about 35 U.S. Standard Sieve Size.

The mineral aggregate is suitably employed in an amount of about 40 to about 85%, preferably 50 to 75% and more preferably about 60 to 66%, by weight of the moldable composition.

(ii) The Mineral Binding Agent

The mineral binding agent functions to hold the mineral aggregate and particulate sulphur together in the shaped body after the compacting and forming of the moldable composition. If the binding agent is not employed, the shaped body formed from the particulate aggregate and sulphur is not sufficiently rigid to retain its shape during the subsequent heating step in which the sulphur melts.

The binding agent enables the formation of a shaped body having structural integrity in the sense that it will retain its shape during the subsequent operations including the step of removing the body from the compacting and forming means, which typically will be a mold, and the drying and heating steps.

As the mineral binding agent it is especially preferred to employ a material having both cohesive and adhesive properties, and in this invention there is preferably employed as the binding agent a clay, particularly a clay which is not swelled or expanded by water. An especially preferred binding agent is kaolin which is relatively insensitive to water, however, other argillaceous and pozzolanic materials can be employed as the binding agent.

Clays are relatively fine in particle size and typically the particle size will range from 150 microns to less than 1 micron.

Clays are essentially hydrated aluminium silicates; the water of hydration in the clay may be sufficient to render the clay cohesive and adhesive so that it will bond the particulate aggregate and sulphur component in the shaped body. However, the liquid vehicle employed in the composition, which is suitably water, enhances the bonding character of the clay.

It is found that the fine clay particles serve to maintain the distribution or suspension of the molten sulphur throughout shaped body during the heating, and prevent drainage or movement of the molten sulphur to a lower part of the shaped body. When clay binding agent was omitted, the density-void configuration of the shaped body was such that the molten sulphur was not held in suspension through the body during the heating step; rather the molten sulphur tended to flow to a lower part of the body causing an uneven distribution of the sulphur in the body, and, consequently poor bonding of the aggregate on solidifying the sulphur.

Further, a clay binding agent which is relatively non-swelling or non-expanding in the presence of water, produces a shaped body which has a minimal tendency for deformation and shrinkage during the heating to melt the sulphur.

The mineral binding agent is suitably employed in an amount of about 5 to 25, preferably about 8 to 15 and more preferably about 10% by weight, based on the weight of the composition. Increase in the clay content is found to reduce the absorption of water when the sulphur concrete article is soaked in water.

(iii) Sulphur Component

The sulphur component may be elemental sulphur or modified elemental sulphur. Modified elemental sulphur is sulphur which has been plasticized; plasticizers for sulphur are known and include dicyclopentadiene, styrene, vinyl toluene, coal tar, terpene polysulphides and olefinic hydrocarbon polymers (U.S. Pat. No. 4,058,500—Vroom, the disclosure of which is herein incorporated by reference), and mixtures thereof.

Modified elemental sulphur produces sulphur concretes within the invention which demonstrate ductility and durability characteristics superior to those of the sulphur concretes of the invention, which contain unmodified elemental sulphur.

The modified sulphur suitably contains about 1 to 10% by weight of the plasticizer, based on the weight of elemental sulphur.

The sulphur component acts as the bonding agent in the concrete. During the heating of the shaped body the sulphur melts, when the sulphur is subsequently solidified during the cooling step, it bonds the mineral aggregate and binding agent particles in a matrix of solid sulphur to form a continuous matrix of sulphur, mineral binding agent and aggregate.

The particulate sulphur component is suitably employed in an amount of about 10 to 30, preferably 15 to 25 and more preferably about 20 to 22%, by weight, based on the weight of the moldable composition.

(iv) Liquid Vehicle

Water is conveniently employed as the liquid vehicle and represents the most economic carrier, however, other liquid vehicles that are volatilizable at temperatures below the melting temperature of sulphur can also be employed, for example, aqueous ammonia or ammonium hydroxide can be employed.

When the water or other liquid vehicle is removed from the shaped body during the drying step, voids are produced in the shaped body. Removal of the water or other liquid vehicle leaves voids corresponding to the volume of vehicle removed. On the other hand voids are formed during the compacting even when high compacting pressures are employed, and during the compacting the water assists the compacting of the particles to a closely packed structure, thereby reducing the volume of voids produced in the compacting.

As the volume of voids in the sulphur concrete increases the strength may decrease.

The content of water or other liquid vehicle is determined by the need for sufficient water to provide a moldable composition and the conflicting effects of the initial content of liquid vehicle on the volume of voids in the sulphur concrete.

Generally, when the vehicle is water, it is found appropriate to employ an amount of about 1 to about 10 and preferably about 4 to 8%, by weight, based on the weight of the moldable composition.

(v) Other Additives

Other conventional additives may optionally be included in the moldable composition including plasticizers for the sulphur, as indicated previously and fire retardants, for example, 1,5,9-cyclodecatriene. Such additives may be chosen having regard to specific applications.

(b) Manufacture of Sulphur Concrete Articles

The sulphur concrete article of the invention is prepared in a process which includes the steps of compacting and forming the moldable sulphur concrete composition into a shaped body, removing volatile liquids from the shaped body, heating the body to melt the sulphur and thereafter cooling the body to solidify the sulphur, whereby the sulphur binds the particulate mineral materials in the body.

The compacting of the moldable composition is carried out at an elevated pressure effective to pack the particles in the composition into a close packed structure so that voids or free volume in the compacted shaped body are minimized. The forming of the composition into a shaped body can be carried out simultaneously by compacting the moldable composition in a mold selected to provide a body of the desired shape.

Suitably the elevated pressure is at least 1,000 p.s.i., typically 1,000 to 2,000 p.s.i. and preferably about 1,500 p.s.i.

The shaped body formed in this way must have sufficient structural integrity to permit its handling in the subsequent operations without collapse of the body, for example, in the removal of the shaped body from the mold such as by extrusion or ejection.

The shaped body thus formed is dried to remove the liquid vehicle and any other volatile liquid that may be present. In particular this step will typically involve removal of water, the preferred liquid vehicle, and any volatile liquid plasticizer. In this case the water and other volatile liquid may be permitted to evaporate from the shaped body by allowing the body to stand at ambient temperature, or the shaped body may be heated to temperatures below the melting or softening point of the sulphur component; generally heating to a temperature of about 100° C. will be suitable.

It is also possible to employ a combination of drying stages in which the shaped body is allowed in a first stage to stand at ambient temperature for a period, whereafter it is heated in a second stage to a temperature of about 100° C.

In the first stage the shaped body is dried to a semidry state, this may be achieved by allowing the shaped body to stand at ambient temperature for a period of 20 to 30 hours. The second stage suitably comprises maintaining the shaped body at a temperature of 100° C. for at least 4 hours and preferably about 6 hours.

The prolonged drying periods are desirable to remove residual water or other liquid in the shaped body. If, for example, water is retained in the shaped body it may cause the development of cracks in the subsequent stage in which the sulphur is melted.

When the dried body is heated to melt the sulphur, the sulphur in the outer portion of the body will begin to melt first and cover the particulate mineral material. If there is still water present in the interior of the body this will subsequently evaporate at the high temperatures and the water vapours escaping from the body may cause the development of cracks resulting in a weakening of the final article, as well as the production of continuous pores, which may be disadvantageous for some applications.

The subsequent heating of the dried shaped body is carried out at an elevated temperature effective to melt the sulphur component but below the temperature at which the sulphur component polymerizes to a high viscosity material.

Thus, when the sulphur component is elemental sulphur, the dried shaped body is heated to a temperature in the general range of about 115° C. to about 200° C., preferably about 120° C. to about 159° C. Above 159° C. the sulphur begins to polymerize, while below 115° C. solidification occurs. Within the range of 120° C. to about 159° C. sulphur is a low viscosity liquid, the minimum viscosity occurring at about 155° C., within this temperature range the sulphur is more readily able to coat the particulate mineral material so that a good bond is produced on solidification.

On the other hand, concretes of acceptable compressive strength were produced employing heating temperatures of 190° C. at which the viscosity of sulphur reaches a maximum. At temperatures above 200° C. the sulphur begins to burn particularly on the surface of the body and this results in an article having an undesirable surface finish.

It is particularly preferred to employ a temperature of about 155° C. for a period of 1 to 6, preferably about 3 to 4 hours.

In the final stage of the manufacture the shaped body is cooled to solidify the sulphur; this is suitably achieved by allowing the shaped body to stand at ambient temperature for 20 to 30 hours.

(c) Sulphur Concrete Article

The moldable compositions of the invention can be employed to produce a variety of sulphur concrete articles including paving slabs, structural members, building blocks, curbing, gutters, pipes and other cast products.

These articles can be produced, in accordance with the invention without excessive shrinkage during the formation of the final article from the molded composition and without segregation of the ingredients.

Thus, articles, particularly structural and building members, can be produced with accurate predetermined dimensions.

The articles of the invention exhibit desirable physical properties, in particular they exhibit good compressive strength and durability in freeze-thaw cycles, as well as being resistant to a variety of chemicals. Properties such as the compressive strength and the plasticity can be modified by varying the content of mineral binding agent, sulphur component and water, as well as the drying temperatures and sulphur melting temperatures employed in the manufacture of the article.

Typically sulphur concrete articles of the invention have compressive strengths in the range of 1,600 to 2,300 typically about 2,000 p.s.i., and a plasticity expressed as the deformation at maximum compressive strength of about 175 to $425 \times 10^{-4}$ ins.

The sulphur concrete articles typically have an air content or void volume comprising 17 to 22%, of the volume of the article which is a narrow range compared to other construction materials; for example, masonry mortar cubes have a void volume of 2 to 20%; expanded aggregate fill concrete has a void volume of 10 to 20% and paste-foam-gravel concrete has a void volume of 20 to 30%.

In order to test the durability of sulphur concrete articles of the invention, sample articles were soaked in water at 25° C. for 1 hour. Inspection of the sample articles after soaking revealed no cracks. The sample articles after soaking were subjected to 3 to 30 freeze-thaw cycles and also to compressive strength tests. The freeze-thaw cycles resulted in a reduction in the compressive strength but no more than a 20% total reduction. The test method used was more severe than the recommended ASTM test for concretes. The compressive strength of samples subjected to the freeze-thaw cycles was generally better for samples having a higher sulphur and clay content. On the other hand, the % reduction in the compressive strength appeared to increase for samples with increase in the clay content, and to decrease with increase in the sulphur content.

BRIEF DESCRIPTION OF THE DRAWINGS

The invention is illustrated in particular embodiments by reference to the accompanying drawings in which.

EXAMPLES

The following examples illustrate the invention:

EXAMPLE 1

Figure 1:
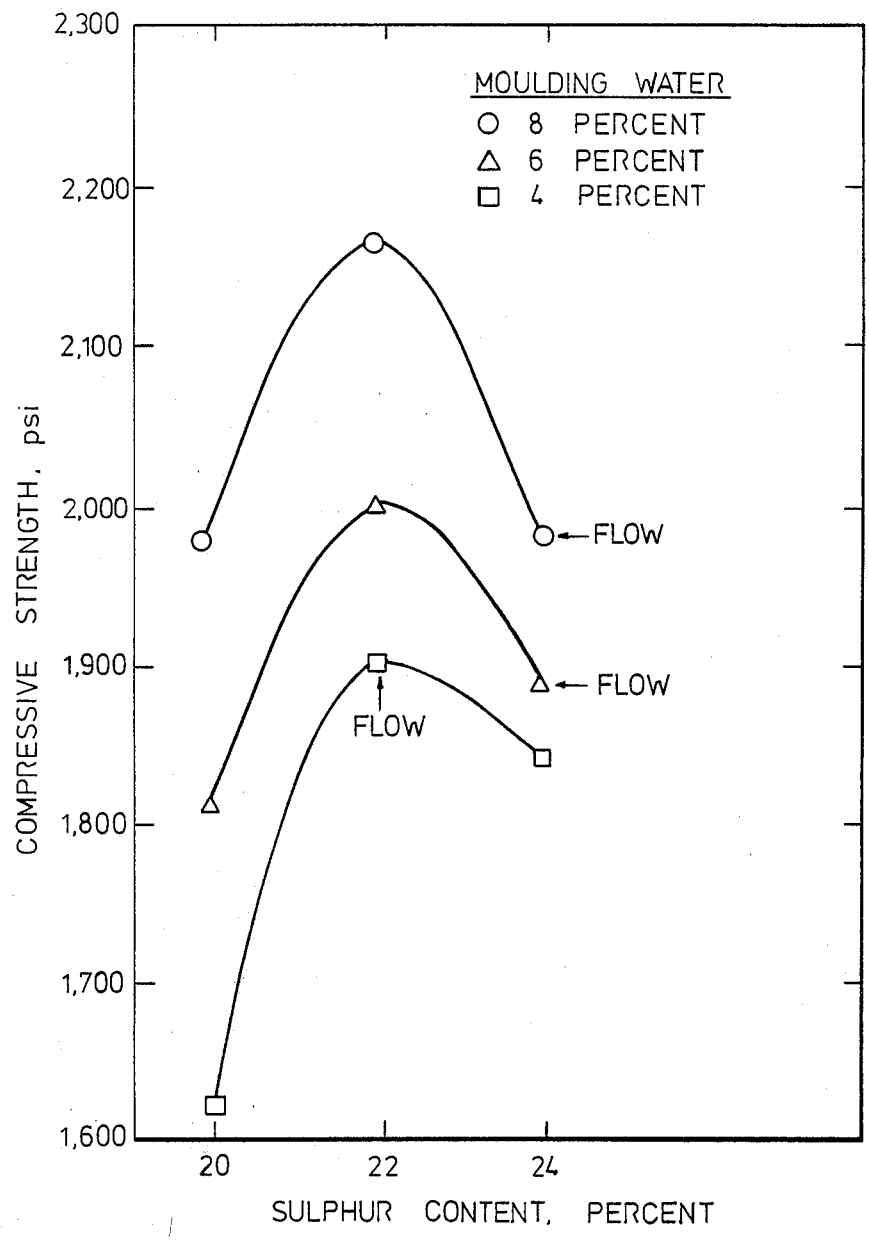
FIG. 1 illustrates graphically the variation in compressive strength with sulphur content and content of molding water of sulphur concretes of the invention.

A number of blocks measuring 4 in. by 4 in. by 5.75 in. high were premolded from a mixture of graded coarse sand, clay (6%, by weight), varying amounts of molding water (4%, 6% and 8%) and varying amounts of powdered sulphur (20%, 22% and 24%). The blocks were prepared by thoroughly mixing the ingredients, compacting the mixture in a steel mold by statically loading at 1,200 psi, immediately extruding each block and storing it at room temperature for 24 hours, whereafter the blocks were dried in an oven at 100° C. for 3 hours until the moisture was driven off and a rigid structure was obtained in which the clay and powdered sulphur acted as a weak cement. The blocks in this condition could be easily handled and stored without damage. The blocks were then heated in an oven for 4 hours at 155° C. to melt the sulphur, cooled to ambient temperature, then tested for compressive strength after 24 hours. FIG. 1 shows the results of strength tests. It can be seen that the strength of sulphur concrete meets the minimum requirements of ASTM C145 for solid load bearing block. The static modulus of elasticity for the optimum condition (from FIG. 1, 22% sulphur, 8% molding water) was $0.713 \times 10^6$ psi.

Figure 2:
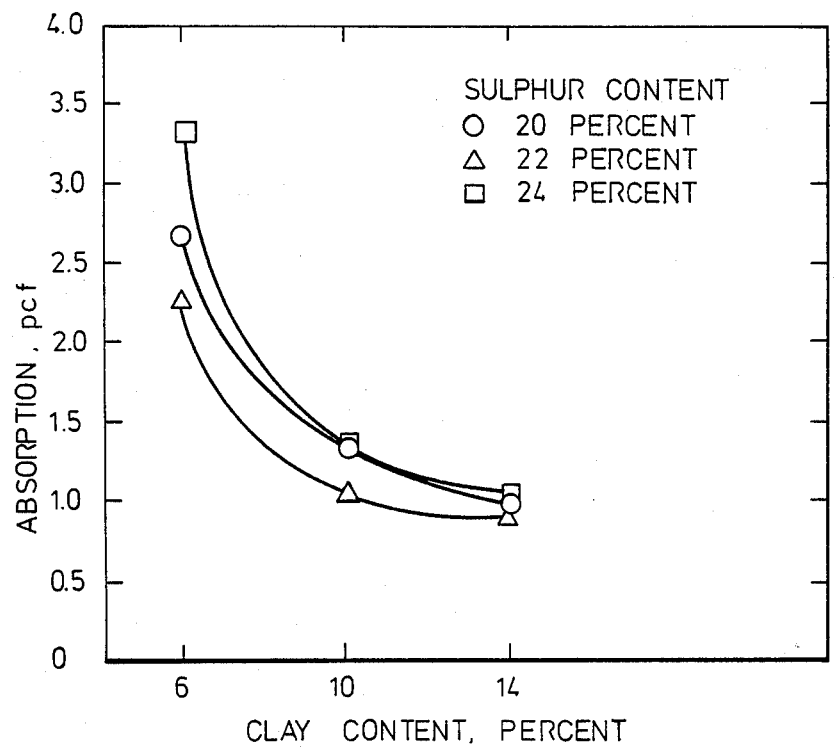
FIG. 2 illustrates graphically the variation in absorption of sulphur concretes of the invention with the content of clay and sulphur.
Figure 3:
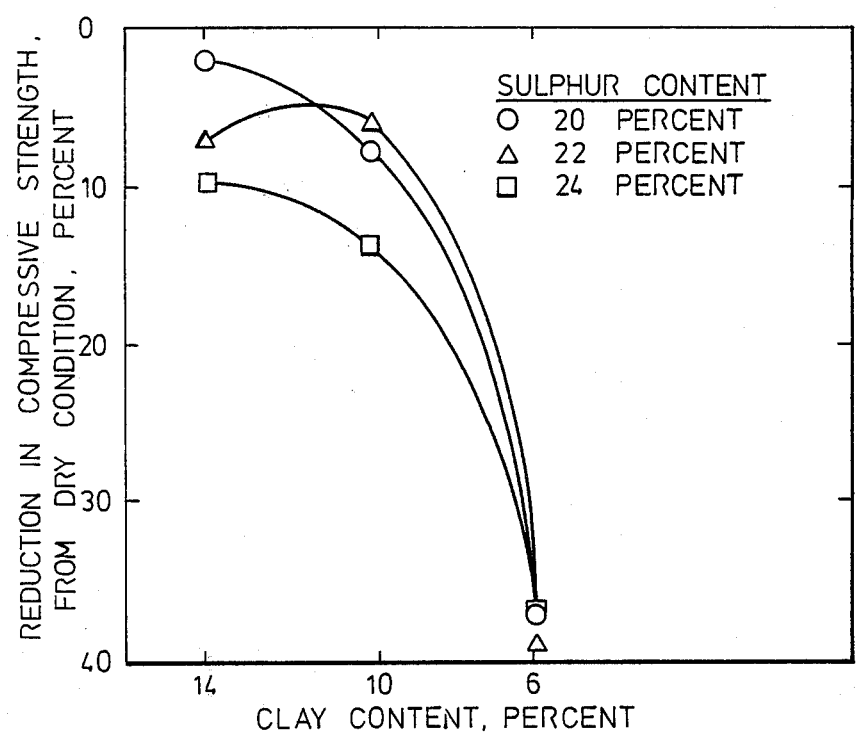
FIG. 3 illustrates graphically the % reduction in compressive strength after 24 hours soaking in water for sulphur concretes of the invention with different contents of clay and sulphur.

The durability of sulphur blocks fabricated in the above manner is demonstrated in FIGS. 2 and 3. After drying and weighing the blocks were submerged in water for 24 hours, reweighed and the water absorption determined. FIG. 2 shows that water absorption varies from about 1 to 3%, well below the 20% minimum required by ASTM C145. Reduction in strength for these same specimens is seen in FIG. 3. Strength (as compared to unsoaked control specimens) was reduced only about 8% for the low absorption specimens and up to 38% for those with the highest absorption, indicating the importance of the ingredients and compaction to reduce the water absorbing voids in the sulphur concrete blocks.

EXAMPLE 2

A similar procedure to that in Example 1 was used to fabricate blocks for durability testing. Mixing ingredients, method, compaction and curing were similar to those of Example 1. Following the melting of sulphur and cooling for 24 hours, the specimens were soaked in water for 1 hour and some of these were tested in compressive strength. Table 1 shows the results of dry vs. soaked strength. These results show only a slight reduction in strength as opposed to the usual assumption that sulphur concrete has poor resistance to water.

TABLE 1

| Sulphur Content (%) | Clay Content (%) | Compressive Strength psi | |
|---|---|---|---|
| | | Dry | Soaked |
| 20 | 6 | 2157 | 2125 |
| | 10 | 2610 | 2459 |
| 22 | 6 | 2327 | 2308 |
| | 10 | 2812 | 2745 |

The products of the invention give rise to a number of advantages, including the following:

1. Economic. A lower manufacturing cost in areas where sulphur is available in quantity and where Portland cement or other binders may be more costly. Since water may typically be utilized in the mixture design, a slurry of water and powdered sulphur can be used in handling the sulphur. Since sulphur in a dry powdered form can be hazardous and even explosive, this is an advantage to the safety of workmen. Further, economic advantage may be realized through the reduced time of manufacture and curing (heating and cooling) as compared to that required for Portland cement concrete or conventional sulphur concrete.

2. Strength and Durability. The pre-molded sulphur concrete articles such as blocks and bricks equal or surpass the requirements for conventional concrete units. Sulphur concrete has superior resistance to many salts or acids and should have considerable advantage in harsh industrial environments.

3. Safety. Heating sulfur above 300° F. may produce harmful quantities of toxic gases such as $H_2S$ and $SO_2$. With conventional sulphur concrete, overheating is a strong possibility. Coupled with the high exposure of workmen who must heat, mix and place the sulphur concrete and the opportunity for exposure, this approach to making articles of sulphur concrete is somewhat hazardous. By the method of this invention, heating of the sulphur can be confined to a temperature controlled oven or tunnel that is vented to the atmosphere. Thus, the potential for exposure and for overheating is considerably reduced.

I claim:

1. A method of producing a shaped sulphur concrete article consisting essentially of:
   (a) providing a moldable mixture consisting essentially of a particulate mineral aggregate, a particulate mineral binding agent, a liquid vehicle and a particulate sulphur component selected from the group consisting of elemental sulphur and modified elemental sulphur,
   (b) compacting and forming the mixture into a shaped body of structural integrity, bonded by said particulate mineral binding agent,
   (c) drying the shaped body at a temperature below the melting or softening point of the sulphur component to drive off said liquid vehicle and form a dried body substantially free of said liquid,
   (d) heating the dried body to a temperature effective to melt the sulphur component in the dried body, said fine particulate mineral binding agent being effective to maintain the molten sulphur component distributed throughout the body during the heating and to prevent drainage or movement of the molten sulphur component to a lower part of the body, and
   cooling the body to solidify the sulphur component and form a shaped article bonded by a matrix of the solid sulphur component.

2. A method according to claim 1, wherein step (b) comprises compacting the mixture in a mold at a pressure of 1,000 to 2,000 psi.

3. A method according to claim 2, wherein step (d) comprises heating said dried body to a temperature of 120° C. to 159° C. for a period of 3 to 4 hours.

4. A method according to claim 1, wherein said moldable mixture comprises about 40 to about 85%, by weight, of said aggregate; about 5 to about 25%, by weight, of said binding agent; about 10 to 30%, by weight, of said sulphur component; and about 1 to about 10%, by weight of water as said liquid vehicle, to a total of 100%, based on the weight of the mixture.

5. A method according to claim 4, wherein said aggregate comprises sand having a particle size in the range of 0.5 to 2 mm; said binding agent comprises a non-expandable clay; and said sulphur component is elemental sulphur.

6. A method according to claim 5, wherein step (c) comprises a first drying stage in which said shaped body is allowed to stand at ambient temperature for a period of 20 to 30 hours, to allow water to evaporate from said shaped body, followed by a second drying stage in which the shaped body is maintained at a temperature of about 100° C. for at least 4 hours to complete the drying.

7. A sulphur concrete composition, free of hydraulic and asphaltic cements, capable of forming a shaped sulphur concrete article after being compacted and formed into a shaped body of structural integrity, dried at a temperature below the melting or softening point of the sulfur component until all liquid vehicle has been driven off, heated to melt the sulphur component, and cooled to solidify the sulphur component, comprising of a moldable mixture of:
   a particulate mineral aggregate;
   a particulate mineral binding agent capable of bonding a shaped body of structural integrity compacted and formed from the composition;
   a liquid vehicle; and
   a particulate sulphur component selected from the group consisting of elemental sulphur and modified elemental sulphur, said sulphur component being present in an amount effective to form a sulphur matrix bonding said aggregate and said mineral binding agent after the melting and cooling steps;
   wherein said particulate mineral binding agent further serves to maintain the sulphur component, when molten, distributed throughout the body and to prevent drainage or movement of the molten sulphur component to a lower part of the shaped body.

8. A composition according to claim 7, comprising about 40 to about 85%, by weight of said aggregate; from about 5 to about 25%, by weight of said binding agent; about 10 to 30%, by weight, of said sulphur component, and about 1 to 10%, by weight, of water as said liquid vehicle to a total of 100%, based on the weight of the mixture.

9. A composition according to claim 8, wherein said aggregate comprises sand having a particle size in the range of 0.5 to 2 mm, said binding agent is a non-expandable clay, and said sulphur component is elemental sulphur.

10. A method of producing a shaped sulphur concrete article without shrinkage, of predetermined dimensions, consisting essentially of:
   (a) providing a moldable mixture consisting essentially of, in weight %, based on the weight of the mixture, 50 to 75% of a particulate mineral aggregate of substantially uniform particle size, 8 to 15% of a non-expandable fine particulate mineral binding agent, 4 to 8% of water and 15 to 25% of a particulate sulphur component selected from the group consisting of elemental sulphur and modified elemental sulphur,
   (b) compacting and forming the mixture into a shaped body of predetermined dimensions, said shaped body having a close packed structure of sufficient structural integrity to permit handling, the particles in the shaped body being bonded together by said fine particulate mineral binding agent,
   (c) drying the shaped body at a temperature below the melting or softening point of the sulphur component to drive off and remove substantially all the water,
   (d) heating the dried body to a temperature effective to melt the sulphur component in the dried body, said fine particulate mineral binding agent being effective to maintain the molten sulphur component distributed throughout the body during the heating and to prevent drainage or movement of the molten sulphur component to a lower part of the body, and (e) cooling the body to solidify the sulphur component and form a shaped article bonded by a matrix of the solid sulphur component.

11. A method according to claim 10, wherein step (c) comprises a first drying stage in which said shaped body bonded by said binding agent is allowed to stand at ambient temperature for a period of 20 to 30 hours, followed by a second drying stage in which the shaped body is maintained at a temperature of about 100° C. for at least 4 hours to remove residual water.

12. A method according to claim 11, wherein step (d) comprises heating the dried body at a temperature in the range of 115° C. to 200° C.

13. A method according to claim 11, wherein said sulphur component is elemental sulphur and step (d) comprises heating the dried body at a temperature of 120° C. to 159° C. for a period of 3 to 4 hours.

14. A method according to claim 11, wherein said binding agent is a non-expandable clay having a particle size not greater than 150 microns.

15. A method according to claim 14, wherein said aggregate is sand having a particle size in the range of 0.5 to 2 mm.

* * * * *

UNITED STATES PATENT AND TRADEMARK OFFICE
CERTIFICATE OF CORRECTION

PATENT NO. : 4,256,499
DATED : March 17, 1981
INVENTOR(S) : Ronald L. TERREL

It is certified that error appears in the above-identified patent and that said Letters Patent are hereby corrected as shown below:

[73] Assignee: Sulphur Development Institute of Canada (SUDIC), Alberta, Canada

Signed and Sealed this

Ninth Day of March 1982

[SEAL]

*Attest:*

*Attesting Officer*

GERALD J. MOSSINGHOFF

*Commissioner of Patents and Trademarks*